(12) United States Patent
Sagae et al.

(10) Patent No.: US 9,629,188 B2
(45) Date of Patent: Apr. 18, 2017

(54) MOBILE COMMUNICATION METHOD AND MOBILE STATION

(75) Inventors: Yuta Sagae, Tokyo (JP); Anil Umesh, Tokyo (JP); Hideaki Takahashi, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/238,636

(22) PCT Filed: Aug. 10, 2012

(86) PCT No.: PCT/JP2012/070424
§ 371 (c)(1),
(2), (4) Date: Feb. 12, 2014

(87) PCT Pub. No.: WO2013/024797
PCT Pub. Date: Feb. 21, 2013

(65) Prior Publication Data
US 2014/0211733 A1 Jul. 31, 2014

(30) Foreign Application Priority Data
Aug. 12, 2011 (JP) .................... 2011-177198

(51) Int. Cl.
*H04W 72/04* (2009.01)
*H04W 76/02* (2009.01)
(Continued)

(52) U.S. Cl.
CPC .......... *H04W 76/02* (2013.01); *H04W 48/12* (2013.01); *H04W 72/0453* (2013.01); *H04W 72/042* (2013.01); *H04W 88/06* (2013.01)

(58) Field of Classification Search
None
See application file for complete search history.

(56) References Cited

U.S. PATENT DOCUMENTS

| 6,546,250 B1 | 4/2003 | Turcotte et al. |
| 8,780,729 B2 * | 7/2014 | Dalsgaard ............. H04W 24/00 370/241 |

(Continued)

FOREIGN PATENT DOCUMENTS

| EP | 1 631 112 A1 | 3/2006 |
| JP | 2003 032166 | 1/2003 |

OTHER PUBLICATIONS

Extended European Search Report issued Mar. 24, 2015 in Patent Application No. 11775095.0.
(Continued)

*Primary Examiner* — Candal Elpenord
(74) *Attorney, Agent, or Firm* — Oblon, McClelland, Maier & Neustadt, L.L.P.

(57) ABSTRACT

A mobile communication method and a mobile station appropriately use equivalent band indicators. The mobile communication method includes: a step of broadcasting, by a radio base station BS, a band indicator indicating a band 19 and an equivalent band indicator indicating bands 5 and B26 overlapping the band 19; and a step of performing, by a mobile station UE, an connection process in a band 5 or B26 when the mobile station is not compatible with the band 19 indicated by the received first band indicator and is compatible with the band 5 or B26 indicated by the received equivalent band indicator.

9 Claims, 5 Drawing Sheets

(51) Int. Cl.
*H04W 48/12* (2009.01)
*H04W 88/06* (2009.01)

(56) References Cited

U.S. PATENT DOCUMENTS

| | | | | |
|---|---|---|---|---|
| 9,338,772 | B2* | 5/2016 | Etemad | H04L 5/003 |
| 2003/0013480 | A1 | 1/2003 | Endo | |
| 2010/0118720 | A1* | 5/2010 | Gauvreau | H04W 72/048 370/252 |
| 2010/0267394 | A1* | 10/2010 | Wu | H04W 24/10 455/450 |
| 2011/0103243 | A1* | 5/2011 | Larsson | H04L 5/001 370/252 |
| 2011/0312328 | A1* | 12/2011 | Choi | H04L 5/0062 455/450 |
| 2012/0113915 | A1* | 5/2012 | Chen | H04W 52/365 370/329 |
| 2012/0184281 | A1* | 7/2012 | Kim | H04W 72/0453 455/450 |
| 2015/0148052 | A1* | 5/2015 | Kazmi et al. | H04W 72/0453 |

OTHER PUBLICATIONS

NTT DOCOMO et al., "CC failure", 3GPP Draft; R2-102486, 3rd Generation Partnership Project (3GPP), vol. RAN WG2, XP050422706, Apr. 6, 2010, pp. 1-2.

NTT DOCOMO et al., "DL and UL CC Linkage for Carrier Aggregation", 3GPP Draft; R2-101534, 3rd Generation Partnership Project (3GPP), XP050421876, vol. RAN WG2, Feb. 16, 2010, 5 pages.

TSG-RAN Working Group 4 (Radio) meeting #58, R4-111214, "TP for TR 37.806: operating band signaling and support of legacy bands" Ericsson, ST —Ericsson , 3 Pages, (Feb. 2011).

3GPP TSG-RAN WG2 Meeting #73, R2-111135, "Open issues for Introduction of new band indicator", Alcatel-Lucent, 4 Pages, (Feb. 2011).

3GPP TSG-RAN WG4 Meeting #59, R4-113310 , "LS on signaling of additional frequency band indicators", RAN4, 1 page, (May 2011).

3GPP TS 25. 101, V10.9.0 ,"$3^{rd}$ Generation Partnership Project; Technical Specification Group Radio Access Network; User equipment (UE) radio transmission and reception (FDD) (Release 10)", (Jul. 2013) Total Pages 283.

3GPP TS 36. 101, V10. 3.0, "$3^{rd}$ Generation Partnership Project; Technical Specification Group Radio Access Network; Evolved Universal Terrestrial Radio Access (E-UTRA); User Equipment (UE) radio transmission and reception (Release 10)", (Jun. 2011), Total pp. 237.

3GPP TS 36.331, V10.2.0, "$3^{rd}$ Generation Partnership Project; Technical Specification Group Radio Access Network; Evolved Universal Terrestrial Radio Access (E-UTRA); Radio Resource Control (RRC); Protocol specification (Release 10)", (Jun. 2011), Total pp. 295.

Japanese Office Action Issued Oct. 22, 2013 in Japanese Application No. 2011 177198 Filed Aug. 12, 2011 (with English translation) (Decision of Refusal).

Japanese Office Action Issued Jul. 19, 2013 in Japanese Application No. 2011 177198 Filed Aug. 12, 2011 (with English Translation) (Notice of Grounds for Rejection).

International Search Report Issued Sep. 18, 2012 in PCT/JP12/070424 Filed Aug. 10, 2012.

Office Action issued Dec. 9, 2016 in European Patent Application No. 12824421.7.

* cited by examiner

MOBILE COMMUNICATION METHOD AND MOBILE STATION

TECHNICAL FIELD

The present invention relates to a mobile communication method and a mobile station.

BACKGROUND ART

In the W-CDMA scheme and the Long Term Evolution (LTE) scheme, a radio base station BS is configured to broadcast a band indicator that indicates a band to be connected by a mobile station UE.

The radio base station BS is configured to broadcast only one band indicator.

On the other hand, the mobile station UE is configured to perform an connection process only in a band having passed an authentication test.

That is, in a case where another band having the same frequency band as the band having passed the authentication test is indicated by the radio base station BS, the mobile station UE cannot perform an connection process in the indicated band.

CITATION LIST

Non-Patent Literature

Non-Patent Literature 1: 3GPP TS25.101
Non-Patent Literature 2: 3GPP TS36.101
Non-Patent Literature 3: 3GPP contribution R4-113310, "LS on signaling of additional frequency band indicators"

SUMMARY OF INVENTION

As described above, in the W-CDMA scheme (Release 99-10 scheme) and the LTE scheme (Release 8-10 scheme), the mobile station UE needs to pass the authentication test in all bands in which the connection process can be performed.

Schemes following the Release 11 scheme suggest that the radio base station BS broadcast an equivalent band indicator for indicating a global band, as well as the existing band indicator.

However, there is a problem in that it is not defined that the mobile station UE must perform the connection process according to which one of the band indicator and the equivalent band indicator is received.

Therefore, the present invention is made in view of the above problem, and is directed to provide a mobile communication method and a mobile station which are capable of appropriately using an equivalent band indicator.

According to a first aspect of the present invention, a mobile communication method includes: a step of broadcasting, by a radio base station, a first band indicator indicating a first band and a second band indicator indicating a second band which overlaps the first band; a step of performing, by a mobile station, an connection process in the first band when the mobile station is compatible with the first band indicated by the received first band indicator; and a step of performing, by the mobile station, an connection process in the second band when the mobile station is not compatible with the first band indicated by the received first band indicator and is compatible with the second band indicated by the received second band indicator.

According to a second aspect of the present invention, a mobile communication method includes: a step of broadcasting, by a radio base station, a band indicator indicating a plurality of overlapping bands in order of narrowing bandwidth; and a step of performing, by a mobile station, an connection process in a compatible band which is first indicated by the received band indicator.

According to a third aspect of the present invention, a mobile station includes: a receiving unit configured to receive a first band indicator and a second band indicator; and an connection processing unit configured to perform an connection process, wherein when the mobile station is compatible with a first band indicated by the first band indicator received by the receiving unit, the connection processing unit performs an connection process in the first band, and when the mobile station is not compatible with the first band indicated by the first band indicator received by the receiving unit and is compatible with a second band indicated by the second band indicator received by the receiving unit, the connection processing unit performs an connection process in the second band.

According to a fourth aspect of the present invention, a mobile station includes: a receiving unit configured to receive a band indicator; and an connection processing unit configured to perform an connection process in a compatible band which is first indicated by the band indicator received by the receiving unit.

DESCRIPTION OF EMBODIMENTS

Mobile Communication System According to First Embodiment of the Present Invention Referring to FIGS. 1 to 5, a mobile communication system according to a first embodiment of the present invention will be described. In all the drawings for describing the present embodiment, the same functions are denoted with the same reference signs, and repeated explanation is omitted.

Figure 1:
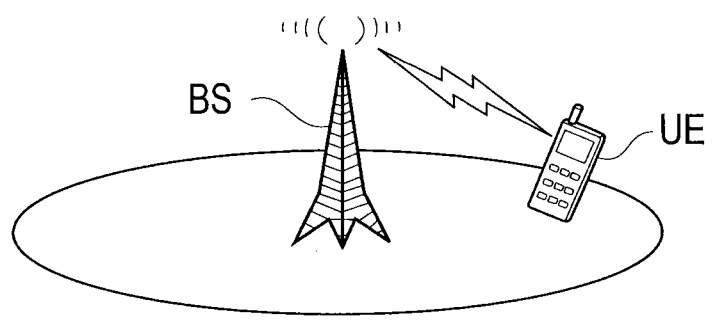
FIG. 1 is an overall configuration diagram of a mobile communication system according to a first embodiment of the present invention.

As illustrated in FIG. 1, the mobile communication system according to the present embodiment includes a radio base station BS.

Figure 2:
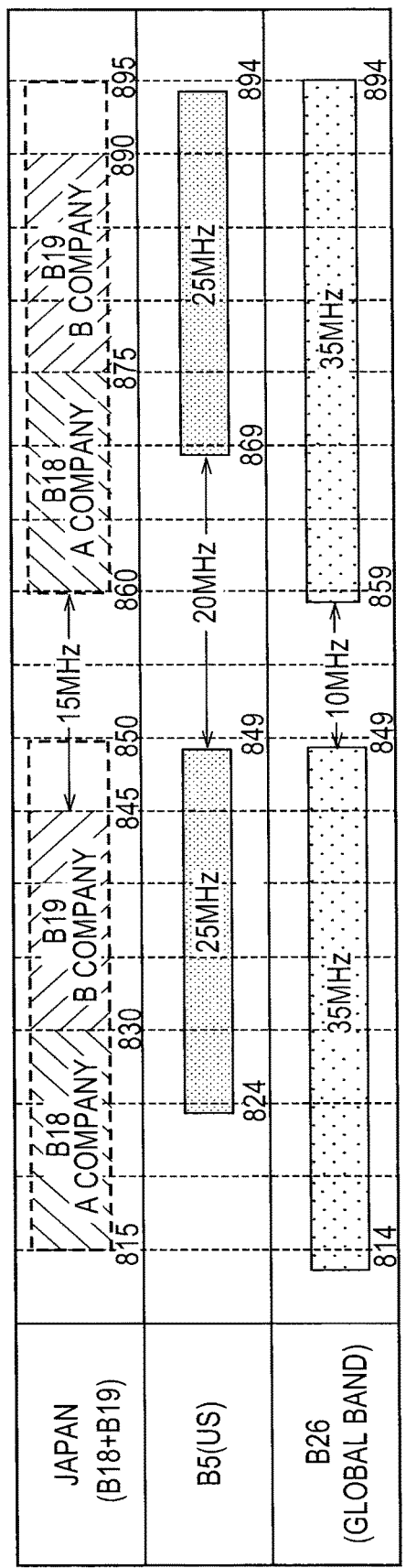
FIG. 2 is a diagram illustrating an example that indicates bands used in the mobile communication system according to the first embodiment of the present invention.

For example, the mobile communication system according to the present embodiment is based on the assumption that bands 18 (B18) and 19 (B19) are used in Japan and a band 5 (B5) is used in the United States, as illustrated in FIG. 2.

Incidentally, in the present specification, a band number (numeral) corresponding to the LTE/LTE-Advanced scheme is used to designate a band, but the present invention can also be applied to a case where a band number (Roman numeral) corresponding to the W-CDMA scheme is used to designate a band.

It is assumed that the band 18 has a bandwidth of 15 MHz from 815 MHz to 830 MHz and a bandwidth of 15 MHz from 860 MHz to 875 MHz and is used by A company.

Also, it is assumed that the band 19 has a bandwidth of 15 MHz from 830 MHz to 845 MHz and a bandwidth of 15 MHz from 875 MHz to 890 MHz and is used by B company.

Furthermore, it is assumed that the band 5 has a bandwidth of 25 MHz from 824 MHz to 849 MHz and a bandwidth of 25 MHz from 869 MHz to 894 MHz.

All of the bands 5, 18 and 19 are the existing bands used in the LTE scheme (Release 8-10). Also, as illustrated in FIG. 2, the band 5 and the bands 18 and 19 are configured to overlap each other.

On the other hand, the band 26 is a global band, the use of which is investigated in a wide range, and a wide band is defined for considering frequency allocation for a broad area. It is assumed that the band 26 has a bandwidth of 35 MHz from 814 MHz to 849 MHz and a bandwidth of 35 MHz from 859 MHz to 894 MHz.

Incidentally, as illustrated in FIG. 2, the band 26 and the bands 5, 18 and 19 are configured to overlap each other.

Figure 3:
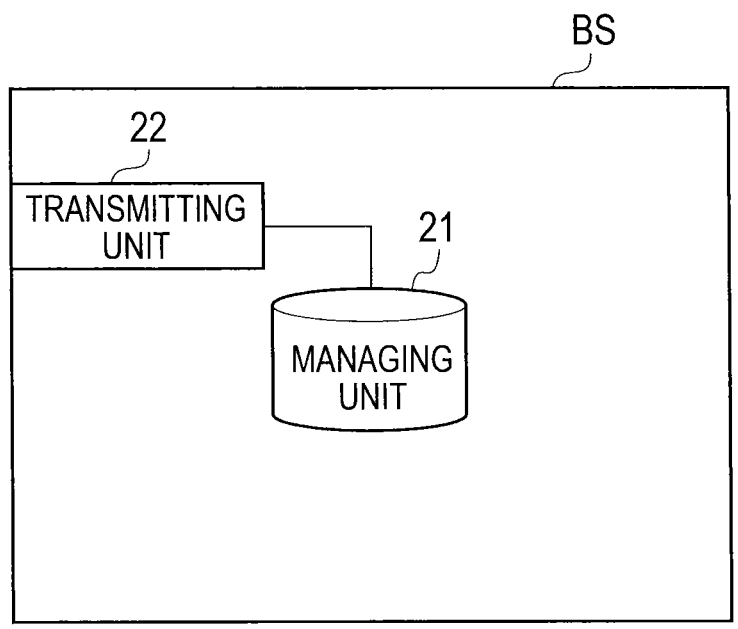
FIG. 3 is a functional block diagram of a radio base station according to the first embodiment of the present invention.

As illustrated in FIG. 3, the radio base station BS according to the present embodiment includes a managing unit 21 and a transmitting unit 22.

The managing unit 21 is configured to manage the band configuration used in the mobile communication system according to the present embodiment. For example, the managing unit 21 is configured to manage the band configuration illustrated in FIG. 2.

The transmitting unit 22 is configured to broadcast a band indicator and an equivalent band indicator with reference to the band configuration managed by the managing unit 21.

For example, in the radio base station BS of A company in Japan, the transmitting unit 22 is configured to broadcast the band indicator indicating the band 18 and also broadcast the equivalent band indicator indicating the bands 5 and B26.

Here, in a case where such an equivalent band indicator indicates a plurality of bands, the equivalent band indicator is configured to indicate the bands in order of narrowing bandwidth, like the band 5→the band 26.

Also, in the radio base station BS of B company in Japan, the transmitting unit 22 is configured to broadcast the band indicator indicating the band 19 and also broadcast the equivalent band indicator indicating the bands 5 and 26.

Here, in a case where such an equivalent band indicator indicates a plurality of bands, the equivalent band indicator is configured to indicate the bands in order of narrowing bandwidth, like the band 5→the band 26.

Furthermore, in the radio base station BS of the operator in the United States, the transmitting unit 22 is configured to broadcast the band indicator indicating the band 5 and also broadcast the equivalent band indicator indicating the bands 19 and 26.

Here, in a case where such an equivalent band indicator indicates a plurality of bands, the equivalent band indicator is configured to indicate the bands in order of narrowing bandwidth, like the band 19→the band 26.

Figure 4:
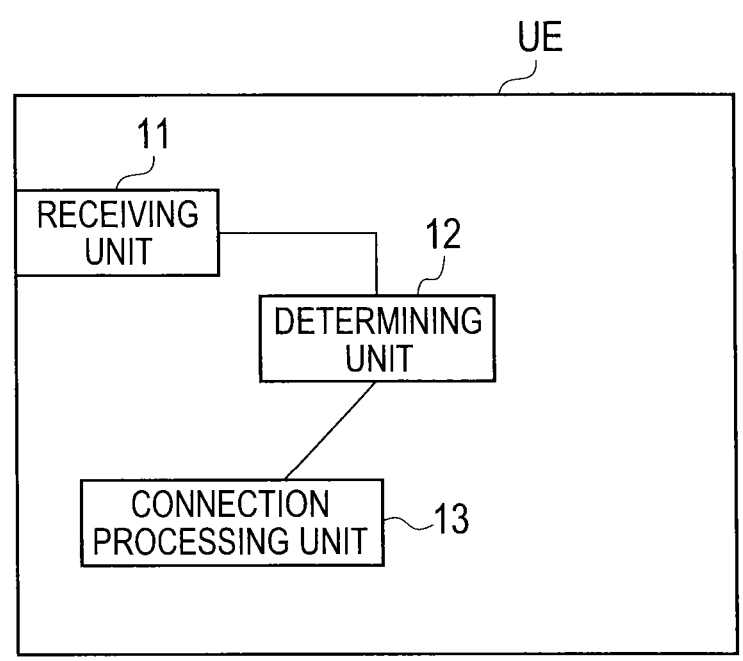
FIG. 4 is a functional block diagram of a mobile station according to the first embodiment of the present invention.

As illustrated in FIG. 4, the mobile station UE according to the present embodiment includes a receiving unit 11, a determining unit 12, and an connection processing unit 13.

The receiving unit 11 is configured to receive various signals from the radio base station BS.

For example, the receiving unit 11 is configured to receive the band indicator and the equivalent band indicator from the radio base station BS.

The determining unit 12 is configured to determine whether the mobile station UE is compatible with the bands (for example, the bands 5, 18 and 19) indicated by the band indicator received by the receiving unit 11.

Also, when it is determined that the mobile station UE is not compatible with the bands (for example, the bands 5, 18 and 19) indicated by the band indicator received by the receiving unit 11, the determining unit 12 determines whether the mobile station UE is compatible with the bands (for example, the bands B5, B19 and B26) indicated by the equivalent band indicator received by the receiving unit 11.

The connection processing unit 13 is configured to perform an connection process in a cell under the radio base station BS.

Specifically, when the determining unit 12 determines that the mobile station UE is compatible with the bands (for example, the bands 5, 18 and 19) indicated by the band indicator, the connection processing unit 13 performs the connection process in the bands (for example, the bands 18, 19, and 5).

Also, when the determining unit 12 determines that the mobile station UE is not compatible with the bands (for example, the bands 5, 18 and 19) indicated by the band indicator and determines that the mobile station UE is compatible with the bands (for example, B5, B19 and B26) indicated by the equivalent band indicator, the connection processing unit 13 performs the connection process in the bands (for example, B5, B19 and B26).

Here, the connection processing unit 13 is configured to connect the bands (for example, the bands 5, 19 and 26) in the order indicated by the equivalent band indicator, so as to secure RF characteristics.

Hereinafter, an example of an operation when the mobile station UE according to the present embodiment performs the connection process will be described with reference to FIG. 5.

Figure 5:
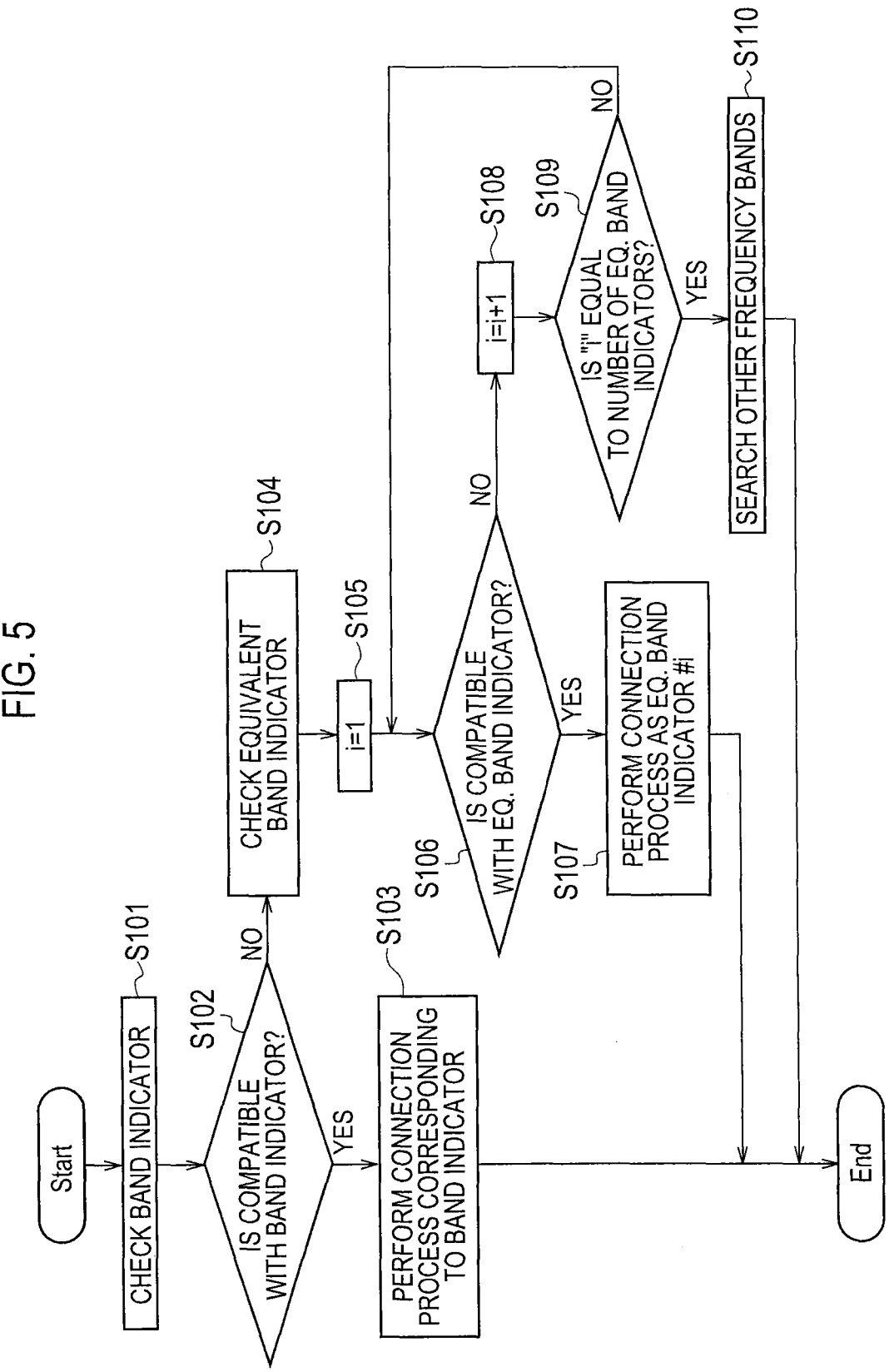
FIG. 5 is a flowchart illustrating an operation of the mobile station according to the first embodiment of the present invention.

As illustrated in FIG. 5, the mobile station UE checks the received band indicator in step S101, and determines whether the mobile station UE is compatible with the bands (for example, the bands 5, 18 and 19) indicated by the band indicator in step S102.

In the case of YES, the present operation proceeds to step S103, and in the case of NO, the present operation proceeds to step S104.

In step S103, the mobile station UE performs the connection process in the bands (for example, the bands 5, 18 and 19) indicated by the band indicator.

On the other hand, the mobile station UE checks the received equivalent band indicator in step S104, sets "i=1" in step S105, and determines whether the mobile station UE is compatible with the band indicated at the i-th by the equivalent band indicator in step S106.

In the case of YES, the present operation proceeds to step S107, and in the case of NO, the present operation proceeds to step S108.

In step S107, the mobile station UE performs the connection process in the band indicated at the i-th by the equivalent band indicator.

On the other hand, the mobile station UE sets "i=i+1" in step S108, and determines whether i is equal to the number of bands indicated by the equivalent band indicator in step S109.

In the case of YES, the present operation proceeds to step S110, and in the case of NO, the present operation returns to step S106.

In step S110, the mobile station UE searches other frequency bands. Incidentally, it is configured such that only one band indicator is indicated in one frequency band.

In the mobile communication system according to the first embodiment of the present invention, even in the case of receiving both the band indicator and the equivalent band indicator, the mobile station UE can perform the connection process in an appropriate band.

First Modification

Hereinafter, a mobile communication system according to a first modification of the present invention will be described with reference to FIG. 6, focusing on a difference from the above-described mobile communication system according to the first embodiment.

In the mobile communication system according to the first modification, the transmitting unit 22 of the radio base station BS is configured to broadcast the equivalent band indicator containing the band indicator with reference to the band configuration managed by the managing unit 21.

For example, in the radio base station BS of B company in Japan, the transmitting unit 22 is configured to broadcast the equivalent band indicator indicating the bands 5, 19 and 26.

Here, in a case where such an equivalent band indicator indicates a plurality of bands, the equivalent band indicator indicates the bands in order of narrowing bandwidth, like the band 19→the band 5→the band 26.

Also, in the radio base station BS of the operator in the United States, the transmitting unit 22 is configured to broadcast the equivalent band indicator indicating the bands 5, 19 and 26.

Here, in a case where such an equivalent band indicates a plurality of bands, the equivalent band indicator indicates the bands in order of narrowing bandwidth, like the band 19→the band 5→the band 26.

In the mobile communication system according to the first modification, the determining unit 12 of the mobile station UE is configured to determine whether the mobile station UE is compatible with the indicated order in the bands indicated by the equivalent band indicator received by the receiving unit 11.

Here, the determining unit 12 is configured to continuously perform the above-described determination until the compatible band is detected.

Hereinafter, an example of an operation when the mobile station UE according to the present embodiment performs the connection process will be described with reference to FIG. 6.

Figure 6:
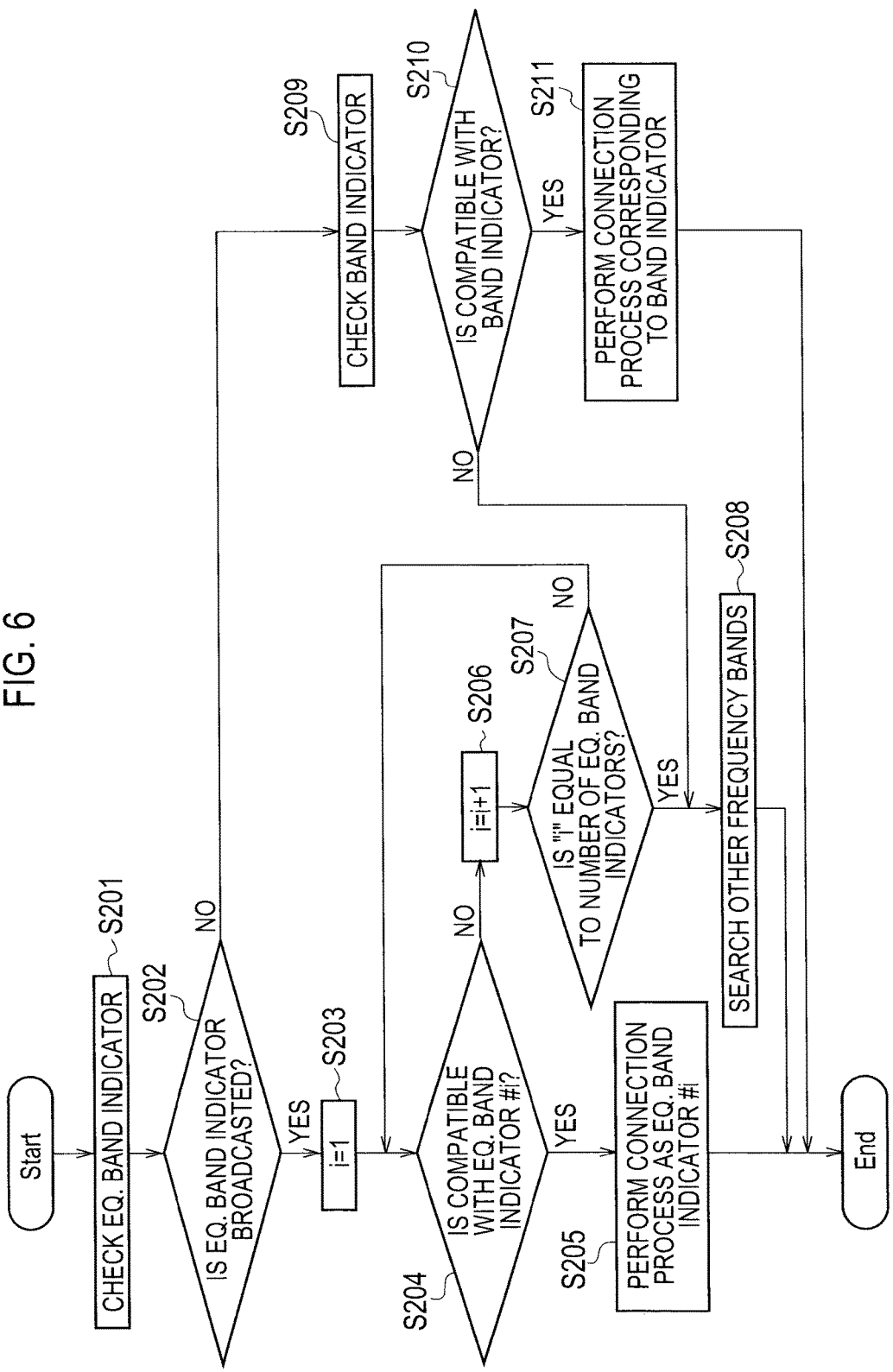
FIG. 6 is a flowchart illustrating an operation of a mobile station according to a first modification of the present invention.

As illustrated in FIG. 6, the mobile station UE checks the received equivalent band indicator in step S201, and determines whether the equivalent band indicator is broadcast in step S202.

In the case of YES, the present operation proceeds to step S203, and in the case of NO, the present operation proceeds to step S209.

The mobile station UE sets "i=1" in step S203, and determines whether the mobile station UE is compatible with the band indicated at the i-th by the equivalent band indicator in step S204.

In the case of YES, the present operation proceeds to step S205, and in the case of NO, the present invention proceeds to step S206.

In step S206, the mobile station UE performs the connection process in the band indicated at the i-th by the equivalent band indicator.

On the other hand, the mobile station UE sets "i=i+1" in step S206, and determines whether "i" is equal to the number of bands indicated by the equivalent band indicator in step S207.

In the case of YES, the present operation proceeds to step S208, and in the case of NO, the present operation returns to step S204.

In step S208, the mobile station UE searches other frequency bands.

The mobile station UE checks the received band indicator in step S209, and determines whether the mobile station UE is compatible with the bands (for example, bands 5, 18 and 19) indicated by the band indicator in step S210.

In the case of YES, the present operation proceeds to step S211, and in the case of NO, the present operation proceeds to step S208.

In step S211, the mobile station UE performs the connection process in the bands (for example, the bands 5, 18 and 19) indicated by the band indicator.

Aspects of the present embodiment described above may be expressed as follows.

According to a first aspect of the present embodiment, a mobile communication method includes: a step of broadcasting, by a radio base station BS, a band indicator (first band indicator) indicating a band 19 (first band) and an equivalent band indicator (second band indicator) indicating bands 5 and B26 (second bands) which overlap the band 19; a step of performing, by a mobile station UE, an connection process in the band 19 when the mobile station UE is compatible with the band 19 indicated by the received band indicator; and a step of performing, by the mobile station UE, an connection process in the band 5 or B26 when the mobile station UE is not compatible with the band 19 indicated by the received equivalent band indicator and is compatible with the band 5 or B26 indicated by the received equivalent band indicator.

According to a second aspect of the present embodiment, a mobile communication method includes: a step of broadcasting, by a radio base station BS, an equivalent band indicator indicating a plurality of overlapping bands 19, B5 and B26 in order of narrowing bandwidth; and a step of performing, by a mobile station UE, an connection process in the compatible band 19, B5 or B26 which is first indicated by the received equivalent band indicator.

According to a third aspect of the present embodiment, a mobile station UE includes: a receiving unit 11 configured to receive a band indicator and an equivalent band indicator; and an connection processing unit 13 configured to perform an connection process, wherein the connection processing unit 13 is configured to perform an connection process in a band 19 when the mobile station UE is compatible with the band 19 indicated by the band indicator received by the receiving unit 11, and the connection processing unit 13 is configured to perform an connection process in the band 5 or B26 when the mobile station UE is not compatible with the band 19 indicated by the band indicator received by the receiving unit 11 and is compatible with the band 5 or B26 indicated by the equivalent band indicator received by the receiving unit 11.

According to a fourth aspect of the present embodiment, a mobile station UE includes: a receiving unit 11 configured to receive an equivalent band indicator; and an connection processing unit 13 configured to perform an connection process in a compatible band 19, B5, or B26 which is first indicated by the equivalent band indicator received by the receiving unit 11.

Incidentally, the operation of the radio base station BS and the mobile station UE described above may be implemented by hardware, may be implemented by a software module which is executed by a processor, or may be implemented by a combination of the hardware and the software module.

The software module may be provided in any type of recording medium, such as a Random Access Memory (RAM), a flash memory, a Read Only Memory (ROM), an Erasable Programmable ROM (EPROM), an Electronically Erasable and Programmable ROM (EEPROM), a register, a hard disk, a removable disk, or a CD-ROM.

Such a recording medium is connected to a processor such that the processor can write information to the recording medium. Also, the recording medium may be integrated into the processor. Also, the recording medium and the processor may be provided inside an ASIC. The ASIC may be provided inside the radio base station BS and the mobile station UE. Also, the recording medium and the processor may be provided inside the radio base station BS and the mobile station UE as discrete components.

While the present invention has been described in detail with reference to the above-described embodiments, it is apparent to those skilled in the art that the present invention is not limited to the embodiments described in this specification. Furthermore, various changes and modifications can be made without departing from the spirit and scope of the invention as defined by the appended claims. Therefore, the descriptions of the present specification are intended for illustrative purposes and have no restrictive meaning for the present invention.

Incidentally, this application is based upon and claims the benefit of priority to Japanese Patent Application No. 2011-177198, filed on Aug. 12, 2011, the entire contents of which are incorporated herein by reference.

INDUSTRIAL APPLICABILITY

As described above, the present invention can provide a mobile communication method and a mobile station, which are capable of appropriately using an equivalent band indicator.

REFERENCE SIGNS LIST

UE mobile station
11 receiving unit
12 determining unit
13 connection processing unit
BS radio base station
21 managing unit
22 transmitting unit

The invention claimed is:

1. A mobile communication method comprising:
broadcasting, by a radio base station, a first band indicator indicating only a first band and a second band indicator indicating a plurality of second bands which overlap the first band;
performing, by a mobile station, a connection process in the first band when the mobile station is compatible with the first band indicated by the received first band indicator; and
performing, by the mobile station, a connection process in one of the plurality of second bands, which are first indicated by the received second band indicator, when the mobile station is not compatible with the first band indicated by the received first band indicator but is compatible with one of the plurality of second bands indicated by the received second band indicator, wherein
the mobile station performs the connection process in the one of the plurality of second bands when the mobile station determines that a band number indicated at an i-th by the second band indicator is equal to a band number with which the mobile station is compatible, the band number indicating a prescribed frequency band.

2. The method of claim 1, wherein
the second band indicator indicates the plurality of second bands in order, and
the method comprises identifying, by the mobile station, a band in the plurality of second bands identified in order with which the mobile station is compatible as the one of the plurality of second bands.

3. A mobile station comprising:
a communication interface configured to receive a first band indicator indicating only a first band and a second band indicator indicating a plurality of second bands which overlap the first band; and
circuitry configured to perform a connection process, wherein
when the mobile station is compatible with the first band indicated by the first band indicator received by the communication interface, the circuitry performs an connection process in the first band, and
when the mobile station is not compatible with the first band indicated by the first band indicator received by the communication interface but is compatible with one of the plurality of second bands first indicated by the second band indicator received by the communication interface, the circuitry performs an connection process in the one of the plurality of second bands, wherein
the circuitry performs the connection process in the one of the plurality of second bands when the circuitry determines that a band number indicated at an i-th by the second band indicator is equal to a band number with which the mobile station is compatible, the band number indicating a prescribed frequency band.

4. The mobile station of claim 3, wherein
the second band indicator indicates the plurality of second bands in order, and
the circuitry is configured to identify a band in the plurality of second bands identified in order with which the mobile station is compatible as the one of the plurality of second bands.

5. The mobile station of claim 4, wherein
the plurality of second bands are ordered by the second band indicator in order of narrowing bandwidth.

6. The mobile station of claim 4, wherein
the plurality of second bands are ordered by the second band indicator in order of narrowing bandwidth.

7. The mobile station of claim 3, wherein
the first band indicator indicates only band 26, and
the circuitry is configured to perform an connection process in band 26 when the mobile station is compatible with band 26 indicated by the first band indicator.

8. The mobile station of claim 7, wherein
the second band indicator indicates at least bands 5, 18 and 19, and
the circuitry is configured to identify a first band of bands 5, 18 and 19 with which the mobile station is compatible as the one of the plurality of second bands.

9. A mobile station comprising:
a communication interface configured to receive a first frequency band indicator indicating only a first frequency band and a second frequency band indicator indicating at least a second frequency band and a third frequency band in order of narrowing bandwidth; and
circuitry configured to
    perform a connection process in the first frequency band when the mobile station is compatible with the first frequency band indicated by the first frequency band indicator;
    determine whether the mobile station is compatible with the second frequency band indicated by the second frequency band indicator when the mobile station is not compatible with the first frequency band indicated by the first frequency band indicator;
    perform a connection process in the second frequency band, which is first indicated by the received second band indicator, when the mobile station is compatible with the second frequency band indicated by the second frequency band indicator;
    determine whether the mobile station is compatible with the third frequency band indicated by the second frequency band indicator when the mobile station is not compatible with the second frequency band indicated by the second frequency band indicator; and
    perform a connection process in the third frequency band when the mobile station is compatible with the third frequency band indicated by the second frequency band indicator.

* * * * *